Nov. 9, 1965    W. P. CHAPMAN ETAL    3,216,252
FLUID FLOW RATE METERS
Filed Oct. 29, 1962    3 Sheets-Sheet 1
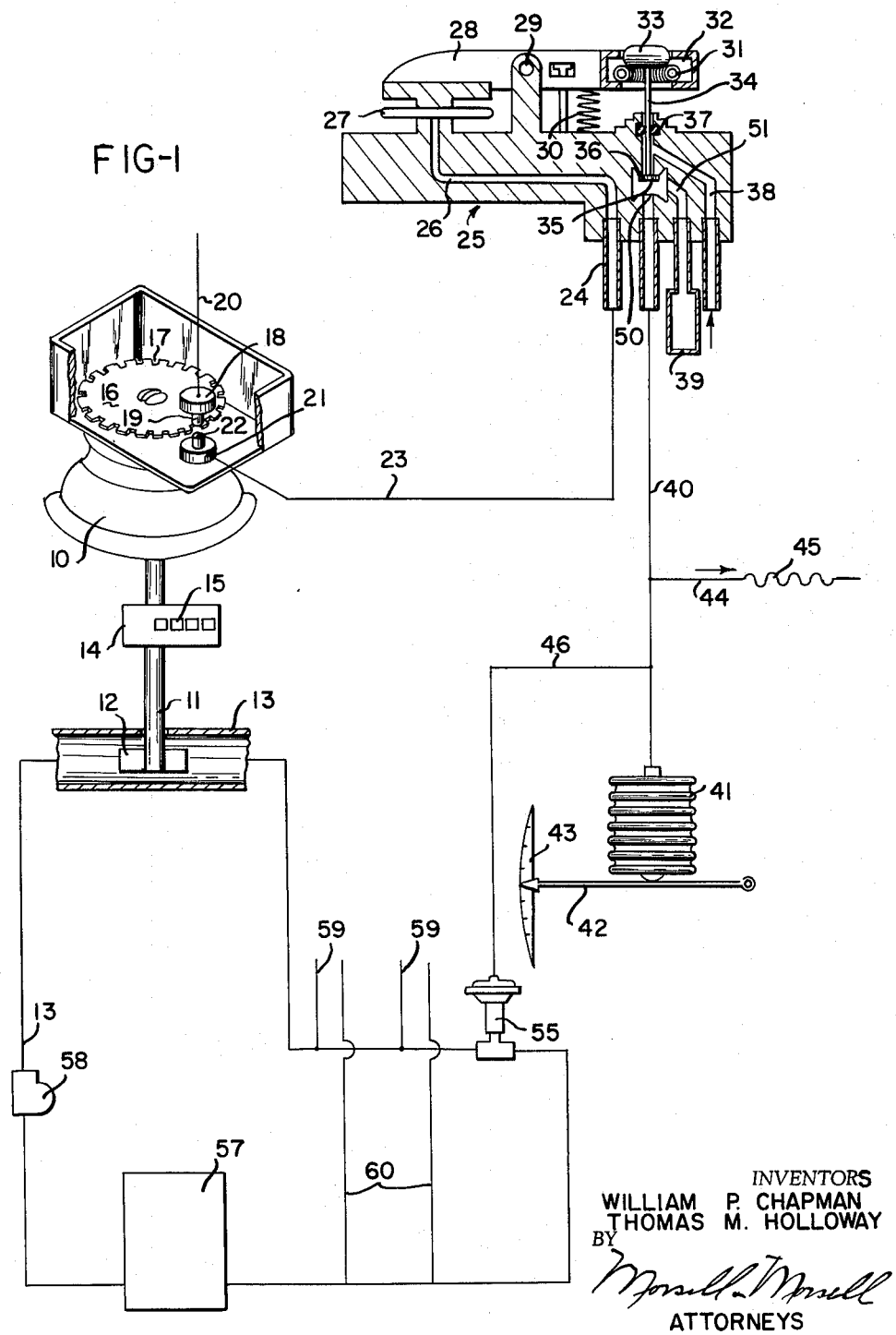
INVENTORS
WILLIAM P. CHAPMAN
THOMAS M. HOLLOWAY
BY
Morsell & Morsell
ATTORNEYS

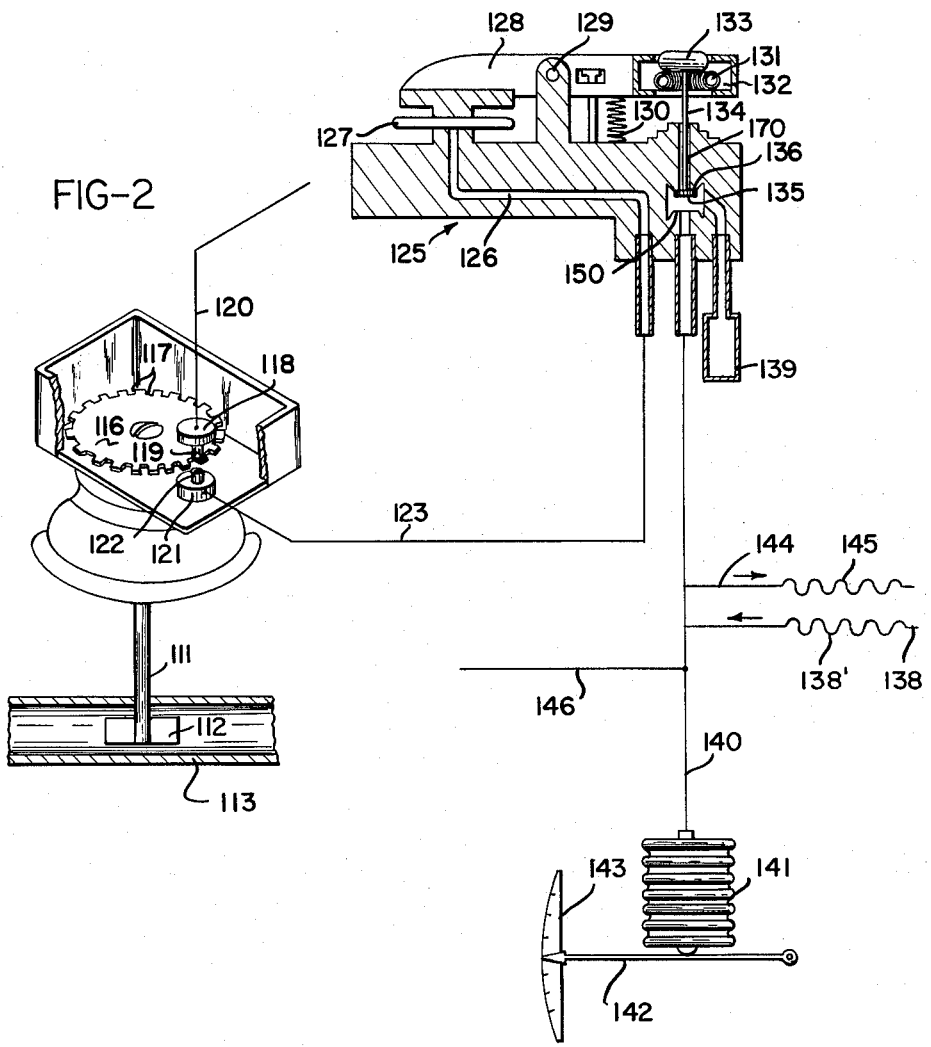

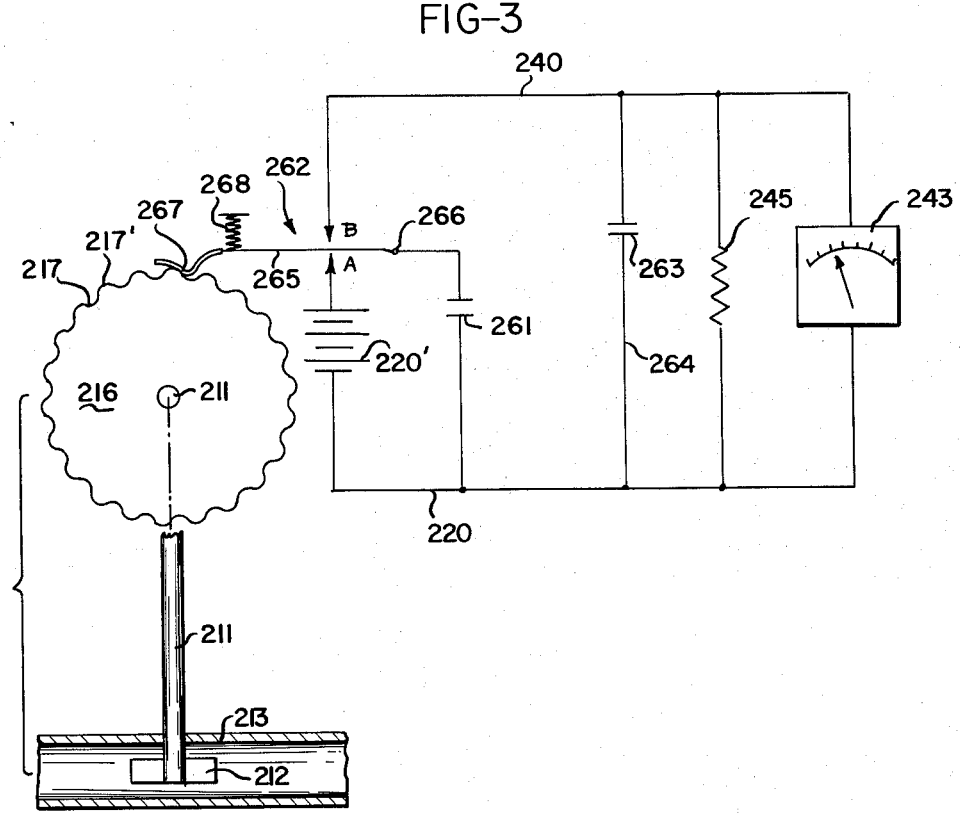

United States Patent Office 3,216,252
Patented Nov. 9, 1965

3,216,252
FLUID FLOW RATE METERS
William P. Chapman, Milwaukee, and Thomas M. Holloway, Waukesha, Wis., assignors to Johnson Service Company, Milwaukee, Wis., a corporation of Wisconsin
Filed Oct. 29, 1962, Ser. No. 233,715
6 Claims. (Cl. 73—229)

This invention relates to improvements in fluid flow rate meters, and more particularly to a meter for indicating the rate of flow of a fluid such as water.

Fluid flow rate meters which are in common use today, such as orifice meters, Venturi meters or variable displacement meters, are expensive, complicated and of doubtful reliability.

It is a general object of the present invention to provide a fluid flow rate meter which makes use of a rotating shaft output as the input of a flow rate indicator whereby it is relatively inexpensive to manufacture, simple and accurate.

A further object of the invention is to provide a fluid flow rate meter having an output which can be used to operate an indicator, which can be recorded, or which can be used to operate a damper or valve for controlling the flow of a fluid according to a flow rate, the instrument being such that it may also be used to operate a totalizing register if desired.

A more specific object of the invention is to provide a device as above described wherein a rotating shaft output is employed to deliver pulses of energy in a unit of time determined by the flow rate, there being novel means for utilizing said pulses to vary the pressure level in a pneumatic or electric system in such a way that said pressure level may be used to indicate or record the actual flow rate or to operate a control in accordance with rate of flow.

With the above and other objects in view, the invention consists of the improved fluid flow rate meter, and all of its parts and combinations, as set forth in the claims, and all equivalents thereof. In the accompanying drawing, illustrating preferred embodiments of the invention:

FIG. 1 is a partially diagrammatic view illustrating one form of fluid flow rate meter as used in a fluid system to indicate or control, the valve being in longitudinal vertical section;

FIG. 2 is a similar view showing a modification; and

FIG. 3 is a diagrammatic view showing still another modification.

Referring more particularly to the drawing, the numeral 10 designates a meter having a shaft 11 with an impeller 12 thereon driven by flow of fluid such as water through a conduit 13. If it is desired to indicate both rate of flow and to totalize flow, there may be a totalizing register 14 driven by the shaft 11 to indicate a quantitative total on a dial 15.

In the present invention the shaft 11 drives a disc 16 having spaced peripheral operating elements such as the slots 17 which are equally spaced circumferentially, each slot being directed radially inwardly of the disc. Suitable means adapted to be acted upon by the operating elements during rotation of the wheel are employed. In the preferred embodiment there is an energy emitter 18 having a nozzle 19 supported above the disc which is in the form of a jet connected with an air pressure line 20 leading from a suitable source of air under pressure. Suitably mounted below the disc is an energy collector 21 having a nozzle 22. In the illustrated embodiment, the collector is connected by an air conduit 23 with a port 24 of a valve member 25. The nozzle 22 has an orifice which is directly in alignment with the orifice of the nozzle 19 of the emitter. When one of the slots 17 is between the nozzles 19 and 22, then a pulse of energy such as air is allowed to pass through the slot into the collector nozzle 22 to act through the conduit 23 upon the valve 25. When a solid portion of the disc, which is between slots, blocks the flow of energy from the emitter to the collector, then there is no pulse of air.

When there is a pulse of air passing to the collector 22, it will act through the conduits 23 and 26 on a diaphragm 27 to push upwardly on the outer end of a lever 28 which is pivoted as at 29, said movement being against the tension of a spring 30. This moves the opposite end of the lever downwardly, forcing a garter spring 31 in a chamber 32 to snap beneath a ball 33 on the upper end of a valve stem 34 to cause closing of a valve 35 against a seat 36. A suitable seal 37 surrounds the upper portion of the valve stem.

When the valve is in the position shown in FIG. 1, supply air under pressure from a suitable source, which is in communication with the valve duct 38, is prevented from flowing into the system. When in this position a small measured amount of air at supply pressure which is in a small reservoir 39 is placed in communication with a system line 40 which may lead to the interior of a bellows 41 forming a part of an indicator, said indicator having a suitable pointer 42 for coaction with a dial 43. As an important part of the system, the system line is allowed to constantly leak to the atmosphere through a leakage line 44 having a restrictor 45 therein.

Any suitable means responsive to the spaced elements such as 17 on the wheel 16 may be employed to similarly control the valve 35.

The pressure in a branch line 46 may be used to control any desired pneumatic instrument whenever it is desired to have the controller operate in accordance with rate of flow in some conduit such as the conduit 13.

For example, the branch line 46 may lead to a pneumatically operated bypass valve 55 in a conduit such as the conduit 13 of a hot water system, there being a heat source 57 and a circulating pump 58, and the meter 10 being driven by flow of liquid through the line 13 as heretofore described. In this system there may be branch conduits 59 leading to the load, with return conduits 60. Thus, the improved device of the present invention will cause the bypass valve to be opened or closed in accordance with the rate of flow through the hot water system.

*Operation of system shown in FIG. 1*

The number of pulses delivered through the line 23 in any unit of time will be determined by the rate of flow of the fluid in the conduit 13, since the speed of the shaft 11 is proportional to the rate of flow. The pressure level in the system, such as in 40 and 41, will be determined by the pulse rate so that the pressure level in conduit 40 and bellows 41 indicates the actual flow rate, which is the main purpose of the meter.

When the jet 19 of the emitter is not exposed to the collector by a slot 17, then there is no pulse of air in the line 23. When there is no pulse, there is no pressure on the diaphragm and the lever 28 is urged by the spring 30 in a counter-clockwise direction. This will cause the garter spring 31 to snap to the opposite side of the ball 33 from that shown in FIG. 1 to push the valve stem 34 and valve member 35 downwardly into engagement with the seat 50. When the valve is in this position, air under pressure from a suitable source, having a pressure substantially higher than the maximum pressure in the system, flows from the duct 38 into the duct 51 to keep the small reservoir 39, charged with one unit of supply air at supply pressure. Whenever a slot is aligned between the jets 19 and 22, then a pulse passes into the line 23 to move the lever 28 to the position shown in FIG. 1 and thereby raise the valve 25 into closing position with respect to the seat 36. This allows the small amount of air at supply pressure from the reservoir 39 to be charged into the system line 40. The system, on the other hand, has a fixed laminar flow leak through the restrictor 45. If pulses of air are delivered at such a rate as to cause charges of air from the reservoir 39 to enter the system at a rate faster than the leakage rate through 45, then the pressure in 40 and 41 will rise. If the flow rate in 13 is such that the leakage at 45 is faster than the supply of new air to the system line 40, then the pressure in the system at 40 and 41 will fall. Thus the pointer 42 will indicate the flow rate. In lieu of the indicator 42–43, there may be a recorder.

As one example, referring to the system of FIG. 1, the restrictor 45 permitted an outflow of 10 cubic inches per minute, with a 1 p.s.i. pressure drop across the restrictor 45. In this example, the wheel 16 had 36 slots and the maximum rate of rotation was 1 r.p.m. At maximum flow rate the pressure in the system was 1 p.s.i. and, at minimum flow rate, the pressure was 0. With a supply pressure at 38 of 15 p.s.i.g., the volume of the small reservoir 39 was approximately 0.14 cubic inch. The volume in the system, including the line 40 and everything in communication therewith, was about 9 cubic inches. This volume is not important except that an increased system volume dampens the surge caused by discharge from the reservoir 39, but such increased system volume will also slow down the response of the system to changes in flow rate.

FIG. 2 illustrates a modification in which pulses of air cause discharge of measured volumes of air from the system, making it possible to maintain the pressure level in the system at an intermediate level. In FIG. 2, parts which correspond to the parts of FIG. 1 are indicated by the same reference numerals preceded by the digit "1" and will not be again described in detail. The structural differences in FIG. 2 are that there is no supply pressure line, such as the line 38 of FIG. 1, leading into the valve. Instead, there is a supply pressure line 138 with a restrictor 138' which is in communication with the system line 140, there being constant leakage out of the line 144 past the restrictor 145. In addition in FIG. 2, when the valve member 135 is on the seat 150, then air from the small reservoir 139 is discharged through the clearance space 170 to the atmosphere.

*Operation of system shown in FIG. 2*

When the valve 135 is in the position shown in FIG. 2, against the seat 136, the system air from the small reservoir 139 is in communication with the system line 140. Each time a slot 117 is beneath the jet 119 to let a pulse of air pass into the line 123, this will act through the diaphragm 127 and lever 128 in the same way as heretofore described in connection with FIG. 1 to move the valve 135 into a position on the seat 150. When this occurs, the small amount of the system air in the reservoir 139 is exhausted to the atmosphere through the clearance space 170 along the valve stem. Supply air is continually fed through the laminar restrictor 138' into the system and is continually exhausted through the laminar restrictor 145. When there is no pulse of air flowing through the line 123, the pressure in the system line 140 will be at some intermediate level depending upon the relative resistances of the restrictors 138' and 145. With each pulse in the line 123 additional air, equal to the volume of 139 is exhausted, tending to lower the pressure in the system 140. The number of pulses in any unit of time will be determined by the rate of fluid flow in the conduit 113, and the pulse rate will determine the pressure level in the system 140, this being an indication of the flow rate in the conduit 113. As illustrated in FIG. 2, the pressure in the system is communicated through the bellows 141 of an indicator to a pointer 142 which coacts with a dial 143. If desired, a totalizing register may be driven by the shaft 111 to totalize flow just as shown in FIG. 1, in which case the same device indicates both rate of flow and total flow. A branch line 146 may be connected just as is the line 46 of FIG. 1 and be employed to control a valve or the like just as illustrated in FIG. 1. While it is preferred to have the pulses of energy from the emitters 19 or 119 in the form of pulses of air, other energy pulses which are capable of being controlled by a wheel having peripherally spaced elements may be employed.

In the system shown in FIG. 2, the restrictors 138' and 145 are so designed that when the disc 116 is not rotating, the system will be at an intermediate pressure. As the disc rotates, the pressure will be reduced by an amount equal to the rate at which the volume in 139 is discharged. In one example, when the disc 116 was not rotating, there was an outflow of air through restrictor 145 of 12 cubic inches per minute, with a supply pressure of 15 p.s.i. at 138. With this relationship, the system pressure in 140–141 was 6 p.s.i. Using a wheel 116 with 36 slots, and a maximum rate of rotation of 1 r.p.m., at maximum flow in the fluid conduit driving the wheel 116, the pressure in 140 will drop to 5 p.s.i., the volume in 139 being about 0.07 cubic inch. Here again, the system volume is important only in determining surge suppression and response rate. In the example just given, the volume in the system, i.e. in 140 and 141 and lines leading therefrom, was about 9 cubic inches.

It is apparent that with the improved invention the dimensions of the wheel 16 or 116 and slots 17 or 117 are not critical, as only one pulse is generated for each slot, and the metering is not dependent on time on or off. In addition, with the present invention, it makes no difference where the wheel 16 or 116 stops when there is no flow in the conduit 13, since the valve 25 or 125 will only react once for each slot or solid portion of the disc. Thus, no continuous supply or exhausting will take place.

*System of Fig. 3*

FIG. 3 illustrates a modification wherein the energy medium in the main system is electricity and wherein charges are pulsed into the main system, the rate of flow being indicated by a voltmeter. In this modification, the rotating wheel 216 has peripherally-spaced pulsing elements in the form of peripheral notches 217 and intervening high spots 217'. The wheel may be driven by a shaft 211 which corresponds in all respects to the shafts 11 and 111 of the forms of the invention of FIGS. 1 and 2, and which may be driven by an impeller such as the impeller 212 in a fluid conduit 213 such as the conduit 13 of FIG. 1.

Referring again to FIG. 3, there is a source of energy medium, corresponding to 38 and 138 of FIGS. 1 and 2, in the form of an electric supply circuit 220 having a source of direct current supply as indicated at 220'. In this circuit is a small capacitor 261. A suitable valve in the form of an electric switch 262 serves as a means for transferring charges of energy which, in this instance, is electricity, from the capacitor 261 to a large capacitor 263 which is in a shunt line 264 across the main system circuit conduits 240. Also shunted across the main system circuit is a constant bleed resistor 245. The main system conduits 240 may be connected to opposite sides of an electrical instrument which may be a voltmeter 243, or it may be an electrically-operated valve corresponding to the valve 55 of FIG. 1 which is in the same fluid conduit 213 as the impeller 212 which rotates the disc 216.

The valve includes an electric switch having actuating means 265 which is pivoted as at 266 and which has a cam-shaped end 267 which rides in and out of the pulsing notches 217 of the rotating disc 216 to transmit pulsing energy mechanically. When the pivoted switch actuating means 265 is riding in a notch under urging of the spring 268, then the contact A is engaged and circuit 220 to the D.C. supply 220' is complete to permit the small capacitor 261 to charge to supply voltage. Each time the pivoted switch actuating means 265 is raised out of a notch 217 by a high point 217' of the wheel periphery then the switch 265 will move against the tension of a spring 268 into engagement with the contact B to thereby place the small capacitor 261 in the main system circuit 240, the circuit 220 being simultaneously broken.

Since the disc 216 rotates at a speed proportional to the rate of fluid flow in the conduit 213, and since the voltage level across capacitor 263 is a function of the number of pulses created by movement of the switch or valve actuator 265, each of which transfers a charge from the small capacitor 261 to the large capacitor 263, it is apparent that the voltage level across the capacitor 263 will be an indication of the rate of flow which can be read upon the voltmeter 243. Alternatively the voltage level can be used to operate an electric valve corresponding to the valve 55 of FIG. 1. Where the voltmeter 243 is employed it will indicate the actual rate of flow in the fluid conduit 13. The voltage level across the capacitor may also be used as the input for any other type of controller, or for a recorder. The system of FIG. 3, therefore, operates on the same principle as the systems of FIGS. 1 and 2. When the pulsing wheel 216 is rotating at such a speed as to cause charges of energy medium or electricity from the small capacitor 261 to be transferred to the large capacitor 263 at a rate faster than the leakage rate from 245, then the pressure in the main system 240 will rise. If, on the other hand, the flow rate at 213 is such that the leakage at 245 is faster than the supply of new charges from the capacitor 261 to the capacitor 263, then the voltage level will fall.

In one typical system of the type illustrated in FIG. 3, the D.C. supply was 200 volts, the capacitor 261 was 0.02 mfd., and the capacitor 263 was 2 mfd. The resistor 245 was approximately 11 megohms, represented by the input impedance of the voltmeter 243 which was used to indicate the flow rate Various other changes and modifications may be made without departing from the spirit of the invention, and all of such changes are contemplated as may come within the scope of the claims.

What we claim is:

1. A flow rate meter comprising a rotatably supported wheel adapted to be driven by fluid flow and having a peripheral portion with peripherally spaced elements, pneumatic energy pulsing means positioned to be acted on by said spaced elements of the wheel whereby there is a pulse of pneumatic energy for each of said spaced elements of the wheel during rotation of the wheel, a pneumatic system separate from said energy pulsing means and including a main system conduit having fluid under pressure therein, means in said separate pneumatic system and separate from said energy pulsing means providing for leakage from said system at a predetermined rate, means including a valve in said separate system movable in response to energy pulses from said pneumatic pulsing means for varying the pressure level in the main system conduit each time a pulse occurs whereby the pressure level in the main system conduit is responsive to the pulse rate, and a pressure responsive instrument connected to said main system conduit and responsive to the pressure level therein.

2. A flow rate meter comprising a rotatably supported wheel adapted to be driven by fluid flow and having a peripheral portion with peripherally spaced slots, a source of fluid under pressure having an emitter jet, a jet collector, means supporting said emitter and collector in alignment with one another on opposite sides of said peripheral portion of the wheel whereby a pulse of fluid is allowed to pass into said collector whenever a slot in the wheel exposes the collector to the emitter during rotation of the wheel, a fluid pressure system separate from said jet collector and including a main system conduit having fluid under pressure therein, means in said separate fluid pressure system and separate from said jet collector providing for leakage from said system at a predetermined rate, means including a valve in said separate system movable in response to pulses of fluid from said collector for varying the pressure level in the main system conduit each time a pulse occurs whereby the pressure level in the main system conduit is responsive to the pulse rate, and an instrument connected to said main system conduit which is responsive to the pressure level therein.

3. A flow rate meter comprising a rotatably supported wheel adapted to be driven by fluid flow and having a peripheral portion with peripherally spaced elements, pulsing means positioned to be acted upon by said spaced elements of the wheel during rotation of the wheel, a fluid pressure system separate from said pulsing means including a main system conduit having fluid under pressure therein, means in said separate fluid pressure system and separate from said pulsing means providing for leakage from said system at a predetermined rate, a small reservoir for a predetermined quantity of fluid, supply means for supplying fluid under pressure, a valve interposed between said supply means, small reservoir, and main system conduit, means normally urging said valve to a position to connect said supply means with said small reservoir and to cut off communication between said small reservoir and main system conduit, means between said pulsing means and valve for causing movement of the valve to a position to connect said small reservoir to said main system conduit each time a pulse occurs to add a quantity of fluid from the small reservoir to the main system conduit whereby the pressure level in the main system conduit is responsive to the pulse rate, and an instrument in connection with the main system conduit responsive to the pressure level.

4. A flow rate meter comprising a rotatably supported wheel adapted to be driven by fluid flow and having a peripheral portion with peripherally spaced slots, an energy source of fluid under pressure having an emitter, an energy collector, means supporting said emitter and collector in alignment with one another on opposite sides of said peripheral portion of the wheel whereby a pulse of fluid under pressure is allowed to pass into said collector whenever a slot in the wheel exposes the collector to the emitter during rotation of the wheel, a fluid pressure system separate from said energy collector and including a main system conduit having fluid under pressure therein, means in said separate fluid pressure system and separate from said energy collector providing for leakage from said system at a predetermined rate, a small reservoir for fluid, supply means for supplying fluid under pressure, a valve interposed between said supply means, small reservoir and main system conduit, means normally urging said valve to a position to connect said supply means with said small reservoir and to cut off communication between said small reservoir and main system conduit, means between said collector and valve for causing movement of the valve to a position to connect said small reservoir to said main system conduit each time a pulse occurs to add a quantity of fluid from the small reservoir to the main system conduit, whereby the pressure level in the main system conduit is responsive to the pulse rate, and an instrument in connection with the main system conduit responsive to the pressure level.

5. A flow rate meter comprising a rotatably supported wheel adapted to be driven by fluid flow and having a peripheral portion with peripherally spaced elements, pulsing means positioned to be acted upon by said spaced elements of the wheel during rotation of the wheel, a pneumatic system separate from said pulsing means including a main system conduit having fluid under pressure therein, means for continuously supplying fluid at a predetermined rate to the main system conduit, means in said separate pneumatic system and separate from said pulsing means providing for leakage from said main system conduit at a predetermined rate, a small reservoir for fluid, a valve interposed between said small reservoir and main system conduit providing for communication between said main system conduit and small reservior, or for exhaust from said small reservoir to atmosphere, means normally urging said valve to a position to connect said small reservoir to said main system conduit, means between said pulsing means and valve for causing movement of the valve to a position to exhaust said small reservoir each time a pulse occurs to subtract a quantity of fluid from the main system conduit whereby the pressure level in the main system conduit is responsive to the pulse rate, and an instrument in connection with the main system conduit responsive to the pressure level.

6. A flow rate meter comprising a rotatably supported wheel adapted to be driven by fluid flow and having a peripheral portion with peripherally spaced slots, an energy source of fluid under pressure having an emitter, an energy collector, means supporting said emitter and collector in alignment with one another on opposite sides of said peripheral portion of the wheel whereby a pulse of fluid under pressure is allowed to pass into said collector whenever a slot in the wheel exposes the collector to the emitter during rotation of the wheel, a pneumatic system separate from said energy collector and including a main system conduit having fluid under pressure therein, means for continuously supplying fluid at a predetermined rate to the main conduit system, means in said separate fluid pressure system and separate from said energy collector providing for leakage from said system at a predetermined rate, a small reservoir for fluid, a valve interposed between said small reservoir and main system conduit providing for communication between said main system conduit and small reservoir, or for exhaust from said small reservoir to atmosphere, means normally urging said valve to a position to connect said small reservoir to said main system conduit, means between said collector and valve for causing movement of the valve to a position to exhaust said small reservoir each time a pulse occurs to subtract a quantity of fluid from the main system conduit, whereby the pressure level in the main system conduit is responsive to the pulse rate, and an instrument in connection with the main system conduit responsive to the pressure level.

References Cited by the Examiner
UNITED STATES PATENTS

| | | | |
|---|---|---|---|
| 1,305,803 | 6/19 | Irwin | 73—231 X |
| 2,473,542 | 6/49 | Philpott | 324—70 |
| 2,623,389 | 12/52 | Van Oosterom | 73—231 |
| 2,642,075 | 6/53 | White | 73—229 X |
| 2,884,940 | 5/59 | Gorrie | 137—82 X |
| 2,962,895 | 12/60 | Rumble | 73—231 X |
| 2,982,902 | 5/61 | Gates et al. | |

FOREIGN PATENTS

| | | |
|---|---|---|
| 328,482 | 4/58 | Switzerland. |

RICHARD C. QUEISSER, *Primary Examiner.*

DAVID SCHONBERG, *Examiner.*